(12) United States Patent
Wang

(10) Patent No.: US 12,036,826 B2
(45) Date of Patent: Jul. 16, 2024

(54) METHOD AND DEVICE FOR UPGRADING TPMS DIAGNOSTIC TOOL

(71) Applicant: AUTEL INTELLIGENT TECHNOLOGY CORP., LTD., Guangdong (CN)

(72) Inventor: Tao Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 853 days.

(21) Appl. No.: 17/130,766

(22) Filed: Dec. 22, 2020

(65) Prior Publication Data

US 2021/0107325 A1 Apr. 15, 2021

Related U.S. Application Data

(63) Continuation of application No. PCT/CN2019/090104, filed on Jun. 5, 2019.

(30) Foreign Application Priority Data

Jun. 29, 2018 (CN) .......................... 201810695090.9

(51) Int. Cl.
*G06F 9/44* (2018.01)
*B60C 23/04* (2006.01)
(Continued)

(52) U.S. Cl.
CPC ............ *B60C 23/0481* (2013.01); *G06F 8/65* (2013.01); *H04L 67/12* (2013.01)

(58) Field of Classification Search
None
See application file for complete search history.

(56) References Cited

U.S. PATENT DOCUMENTS

2009/0021362 A1 1/2009 Kochie
2009/0119657 A1* 5/2009 Link .................. G06F 8/64
717/171
(Continued)

FOREIGN PATENT DOCUMENTS

CN 102862450 A 1/2013
CN 102963219 A 3/2013
(Continued)

OTHER PUBLICATIONS

The First Chinese Office Action dated Jun. 27, 2019; Appln. No. 201810695090.9.
(Continued)

*Primary Examiner* — Qamrun Nahar

(57) ABSTRACT

Embodiments of the present invention provide a method and a device for upgrading a tire pressure monitoring system (TPMS) diagnostic tool. The TPMS diagnostic tool is provided with a wireless communications interface. The method includes: obtaining latest version information of the TPMS diagnostic tool from a server through the wireless communications interface, the latest version information including a latest version number and an upgrade path, the upgrade path being used for indicating a storage location of an upgrade package of the TPMS diagnostic tool in the server; obtaining a current version number of the TPMS diagnostic tool; obtaining an upgrade package corresponding to the upgrade path from the server through the wireless communications interface when it is determined that the latest version number is different from the current version number; and upgrading the TPMS diagnostic tool according to the upgrade package. In this way, not only the TPMS diagnostic tool can be upgraded in a timely manner, but also a process of upgrading the TPMS diagnostic tool can be simplified.

14 Claims, 5 Drawing Sheets

(51) Int. Cl.
  *G06F 8/65* (2018.01)
  *H04L 67/12* (2022.01)

(56) References Cited

U.S. PATENT DOCUMENTS

| | | |
|---|---|---|
| 2010/0204878 A1 | 8/2010 | Drew et al. |
| 2012/0101855 A1* | 4/2012 | Collins .................. G06Q 40/08 705/4 |
| 2015/0234647 A1* | 8/2015 | Lai ........................... G06F 8/65 717/169 |
| 2019/0146776 A1* | 5/2019 | Chen ....................... G06F 8/658 717/169 |

FOREIGN PATENT DOCUMENTS

| | | |
|---|---|---|
| CN | 103419577 A | 12/2013 |
| CN | 103532922 A | 1/2014 |
| CN | 103699120 A | 4/2014 |
| CN | 104076806 A | 10/2014 |
| CN | 105718371 A | 6/2016 |
| CN | 106292625 A | 1/2017 |
| CN | 106802818 A | 6/2017 |
| CN | 107160954 A | 9/2017 |
| CN | 107225918 A | 10/2017 |
| CN | 108973542 A | 12/2018 |
| CN | 103587357 A | 2/2019 |
| EP | 2043054 A1 | 4/2009 |
| JP | 2006031121 A | 2/2006 |

OTHER PUBLICATIONS

The Second Chinese Office Action dated Dec. 4, 2019; Appln. No. 201810695090.9.
The International Search Report mailed Aug. 15, 2019; PCT/CN2019/090104.

* cited by examiner

METHOD AND DEVICE FOR UPGRADING TPMS DIAGNOSTIC TOOL

This application is a continuation application of International Application No. PCT/CN2019/090104, filed on Jun. 5, 2019, which claims priority of Chinese Patent Application No. 201810695090.9, filed on Jun. 29, 2018, which is incorporated herein by reference in its entirety.

BACKGROUND

Technical Field

The present application relates to the field of computer technologies, and in particular, to a method and a device for upgrading a tire pressure monitoring system (TPMS) diagnostic tool.

Related Art

Currently, most vehicles are provided with a TPMS. The TPMS is configured to monitor a tire pressure of a vehicle and generates alarm information when determining that the tire pressure does not meet a preset condition.

To ensure safety of the vehicle, the TPMS disposed in the vehicle may be diagnosed by using a TPMS diagnostic tool, to ensure that the TPMS in the vehicle can work normally. During actual application, to ensure reliability and stability of the TPMS diagnostic tool, the TPMS diagnostic tool needs to be upgraded from time to time. In the prior art, the TPMS diagnostic tool is usually upgraded by using a computer. Specifically, software for upgrading the TPMS diagnostic tool is installed in the computer, the TPMS diagnostic tool is connected to the computer by using a universal serial bus (USB), and the TPMS diagnostic tool is upgraded by using the software in the computer.

However, during actual application, only after the TPMS diagnostic tool is connected to the computer and the TPMS diagnostic tool is detected by using the software in the computer, a user can learn whether the TPMS diagnostic tool needs to be upgraded, and the user needs to manually upgrade the TPMS diagnostic tool in the computer. It can be learned from the above that in the prior art, the TPMS diagnostic tool cannot be upgraded in a timely manner and a process of upgrading the TPMS diagnostic tool is complicated.

SUMMARY

Embodiments of the present invention provide a method and a device for upgrading a TPMS diagnostic tool, which not only upgrade the TPMS diagnostic tool in a timely manner, but also simplify a process of upgrading the TPMS diagnostic tool.

According to a first aspect, an embodiment of the present invention provides a method for upgrading a TPMS diagnostic tool, the TPMS diagnostic tool being provided with a wireless communications interface, and the method including:

obtaining latest version information of the TPMS diagnostic tool from a server through the wireless communications interface, the latest version information including a latest version number and an upgrade path, the upgrade path being used for indicating a storage location of an upgrade package of the TPMS diagnostic tool in the server;

obtaining a current version number of the TPMS diagnostic tool;

obtaining an upgrade package corresponding to the upgrade path from the server through the wireless communications interface when it is determined that the latest version number is different from the current version number; and upgrading the TPMS diagnostic tool according to the upgrade package.

In a possible implementation, the obtaining latest version information of the TPMS diagnostic tool from a server through the wireless communications interface includes:

obtaining the latest version information of the TPMS diagnostic tool from the server through the wireless communications interface when it is determined to access a wireless network through the wireless communications interface or when an upgrade query instruction input by a user is received.

In another possible implementation, before the obtaining an upgrade package corresponding to the upgrade path from the server through the wireless communications interface, the method further includes:

generating upgrade indication information; and receiving upgrade confirmation information input by the user according to the upgrade indication information.

In another possible implementation, before the obtaining a current version number of the TPMS diagnostic tool, the method further includes:

determining whether the latest version information is valid; and the obtaining a current version number of the TPMS diagnostic tool includes:

obtaining the current version number of the TPMS diagnostic tool when it is determined that the latest version information is valid.

In another possible implementation, the determining whether the latest version information is valid includes:

obtaining a format of the latest version number and a format of the upgrade path; and determining whether the latest version information is valid according to the format of the latest version number and the format of the upgrade path.

In another possible implementation, if it is determined that the latest version number is invalid, the method further includes:

re-obtaining the latest version information, and accumulating a quantity of invalid times of obtaining the latest version information; and the obtaining a current version number of the TPMS diagnostic tool includes:

obtaining the current version number of the TPMS diagnostic tool when the quantity of invalid times is less than a preset quantity-of-times threshold and the re-obtained latest version information is valid.

In another possible implementation, if it is determined that the latest version number is invalid, the method further includes:

re-obtaining the latest version information, and recording duration for re-obtaining the latest version information; and the obtaining a current version number of the TPMS diagnostic tool includes:

obtaining the current version number of the TPMS diagnostic tool when the duration is less than a preset duration threshold and the re-obtained latest version information is valid.

In another possible implementation, the upgrading the TPMS diagnostic tool according to the upgrade package includes:
performing verification on the upgrade package; and
upgrading the TPMS diagnostic tool according to the upgrade package after the verification on the upgrade package succeeds.

According to a second aspect, an embodiment of the present invention provides a device for upgrading a TPMS diagnostic tool, including a wireless communications interface, a processor, a memory and a communications bus, the communications bus being configured to implement a connection between components, the memory being configured to store a program instruction, and the processor being configured to read the program instruction in the memory and perform the following steps according to the program instruction in the memory:
obtaining latest version information of the TPMS diagnostic tool from a server through the wireless communications interface, the latest version information including a latest version number and an upgrade path, the upgrade path being used for indicating a storage location of an upgrade package of the TPMS diagnostic tool in the server;
obtaining a current version number of the TPMS diagnostic tool;
obtaining an upgrade package corresponding to the upgrade path from the server through the wireless communications interface when it is determined that the latest version number is different from the current version number; and
upgrading the TPMS diagnostic tool according to the upgrade package.

In a possible implementation, the processor is specifically configured to:
obtain the latest version information of the TPMS diagnostic tool from the server through the wireless communications interface when it is determined to access a wireless network through the wireless communications interface or when an upgrade query instruction input by a user is received.

In another possible implementation, the processor is further configured to:
generate upgrade indication information before the processor obtains the upgrade package corresponding to the upgrade path from the server through the wireless communications interface; and receive upgrade confirmation information input by the user according to the upgrade indication information.

In another possible implementation, the processor is further configured to:
determine whether the latest version information is valid before the processor obtains the current version number of the TPMS diagnostic tool; and
correspondingly, the processor is specifically configured to obtain the current version number of the TPMS diagnostic tool when it is determined that the latest version information is valid.

In another possible implementation, the processor is specifically configured to:
obtain a format of the latest version number and a format of the upgrade path; and
determine whether the latest version information is valid according to the format of the latest version number and the format of the upgrade path.

In another possible implementation, the processor is further configured to:
re-obtain the latest version information and accumulate a quantity of invalid times of obtaining the latest version information when the processor determines that the latest version number is invalid; and
correspondingly, the processor is specifically configured to obtain the current version number of the TPMS diagnostic tool when the quantity of invalid times is less than a preset quantity-of-times threshold and the re-obtained latest version information is valid.

In another possible implementation, the processor is further configured to:
re-obtain the latest version information and record duration for re-obtaining the latest version information when the processor determines that the latest version number is invalid; and
correspondingly, the processor is specifically configured to obtain the current version number of the TPMS diagnostic tool when the duration is less than a preset duration threshold and the re-obtained latest version information is valid.

In another possible implementation, the processor is specifically configured to:
perform verification on the upgrade package; and
upgrade the TPMS diagnostic tool according to the upgrade package after the verification on the upgrade package succeeds.

According to a third aspect, an embodiment of the present invention provides an upgrade apparatus of a TPMS diagnostic tool, the TPMS diagnostic tool being provided with a wireless communications interface, the apparatus including an obtaining module and an upgrade module.

The obtaining module is configured to obtain latest version information of the TPMS diagnostic tool from a server through the wireless communications interface, the latest version information including a latest version number and an upgrade path, the upgrade path being used for indicating a storage location of an upgrade package of the TPMS diagnostic tool in the server.

The obtaining module is further configured to obtain a current version number of the TPMS diagnostic tool.

The obtaining module is further configured to obtain an upgrade package corresponding to the upgrade path from the server through the wireless communications interface when it is determined that the latest version number is different from the current version number.

The upgrade module is configured to upgrade the TPMS diagnostic tool according to the upgrade package.

In a possible implementation, the obtaining module is specifically configured to:
obtain the latest version information of the TPMS diagnostic tool from the server through the wireless communications interface when it is determined to access a wireless network through the wireless communications interface or when an upgrade query instruction input by a user is received.

In another possible implementation, the apparatus further includes a generating module and a receiving module.

The generating module is configured to generate upgrade indication information before the obtaining module obtains the upgrade package corresponding to the upgrade path from the server through the wireless communications interface.

The receiving module is configured to receive upgrade confirmation information input by the user according to the upgrade indication information.

In another possible implementation, the apparatus further includes a verification module.

The verification module is configured to determine whether the latest version information is valid before the obtaining module obtains the current version number of the TPMS diagnostic tool.

Correspondingly, the obtaining module is specifically configured to obtain the current version number of the TPMS diagnostic tool when it is determined that the latest version information is valid.

In another possible implementation, the verification module is specifically configured to:
obtain a format of the latest version number and a format of the upgrade path; and
determine whether the latest version information is valid according to the format of the latest version number and the format of the upgrade path.

In another possible implementation, the obtaining module is further configured to:
re-obtain the latest version information and accumulate a quantity of invalid times of obtaining the latest version information when it is determined that the latest version number is invalid; and
obtain the current version number of the TPMS diagnostic tool when the quantity of invalid times is less than a preset quantity-of-times threshold and the re-obtained latest version information is valid.

In another possible implementation, the obtaining module is further configured to:
re-obtain the latest version information and record duration for re-obtaining the latest version information when it is determined that the latest version number is invalid; and
obtain the current version number of the TPMS diagnostic tool when the duration is less than a preset duration threshold and the re-obtained latest version information is valid.

In another possible implementation, the upgrade module is specifically configured to:
perform verification on the upgrade package; and
upgrade the TPMS diagnostic tool according to the upgrade package after the verification on the upgrade package succeeds.

According to a fourth aspect, an embodiment of the present invention provides a readable storage medium, including a program or an instruction, when the program or instruction is run on a computer, the method according to any implementation of the first aspect being performed.

According to the method and the device for upgrading a TPMS diagnostic tool, the TPMS diagnostic tool is provided with a wireless communications interface, and a wireless network may be accessed through the wireless communications interface. After the wireless network is accessed, latest version information of the TPMS diagnostic tool may be obtained from a server through the wireless communications interface, and a current version number of the TPMS diagnostic tool may be obtained. When it is determined that a latest version number is different from the current version number, an upgrade package is obtained from the server through the wireless communications interface according to an upgrade path, and the TPMS diagnostic tool is upgraded according to the upgrade package. In the process described above, the TPMS diagnostic tool may automatically determine whether the TPMS diagnostic tool needs to be upgraded. When it is determined that the TPMS diagnostic tool needs to be upgraded, the upgrade package may be automatically downloaded, and the diagnostic tool may be upgraded according to the upgrade package, thereby not only upgrading the TPMS diagnostic tool in a timely manner, but also simplifying a process of upgrading the TPMS diagnostic tool.

DETAILED DESCRIPTION

To make the objectives, technical solutions, and advantages of embodiments of the present invention clearer, the following clearly and completely describes the technical solutions in the embodiments of the present invention with reference to the accompanying drawings in the embodiments of the present invention. Apparently, the described embodiments are some rather than all of the embodiments of the present invention. Based on the embodiments of the present invention, all other embodiments obtained by a person of ordinary skill in the art without creative efforts shall fall within the protection scope of the present invention.

Figure 1:
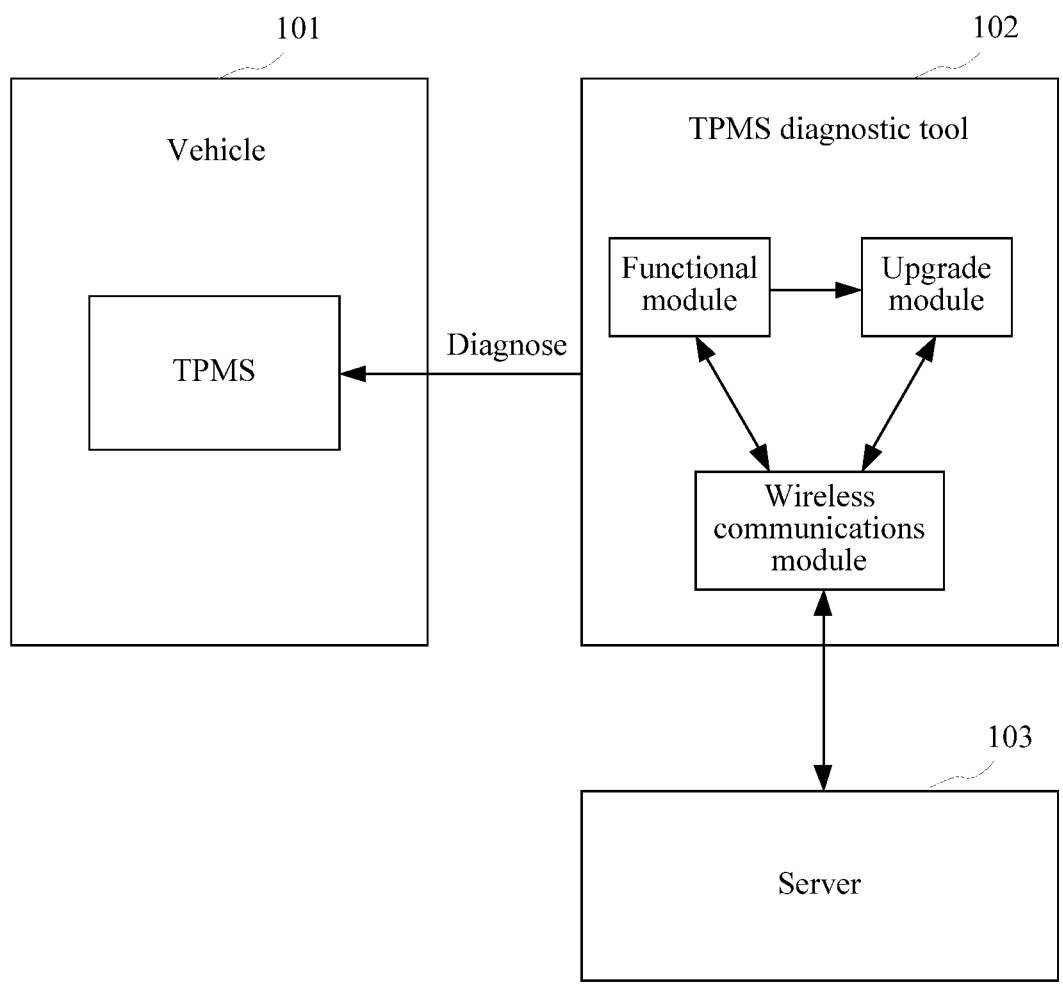
FIG. 1 is an architectural diagram of upgrading a TPMS diagnostic tool according to an embodiment of the present invention.

FIG. 1 is an architectural diagram of upgrading a TPMS diagnostic tool according to an embodiment of the present invention. Referring to FIG. 1, a vehicle 101, a TPMS diagnostic tool 102 and a server 103 are included.

The vehicle 101 is provided with a TPMS. The TPMS is configured to monitor a tire pressure and other parameters of the vehicle, and generate alarm information when the tire pressure and other parameters of the vehicle do not meet a condition.

The TPMS diagnostic tool 102 includes at least a functional module, an upgrade module and a wireless communications interface. The TPMS diagnostic tool 102 may establish a wireless connection to the server 103 through the wireless communications interface, and interact with the server 103 through the wireless communications interface.

The server 103 includes latest version information, an upgrade package and the like of the TPMS diagnostic tool. The functional module in the TPMS diagnostic tool 102 may obtain the latest version information from the server 103 through the wireless communications interface, and determine, according to the latest version information, whether the TPMS diagnostic tool 102 needs to be upgraded. When it is determined that the TPMS diagnostic tool 102 needs to be upgraded, the functional module may send a notification message to the upgrade module, so that the upgrade module obtains the upgrade package from the server 103 through the wireless communications interface, and upgrades the TPMS diagnostic tool according to the upgrade package.

In the present application, the wireless communications interface is set in the TPMS diagnostic tool, so that the TPMS diagnostic tool can access a wireless network through the wireless communications interface. In this way, the TPMS diagnostic tool can interact with the server through the wireless network, to obtain the latest version number of the TPMS diagnostic tool from the server, and determine, according to the latest version number, whether the TPMS diagnostic tool needs to be upgraded. When it is determined that the TPMS diagnostic tool needs to be upgraded, the TPMS diagnostic tool may obtain the upgrade package from the server through the wireless communications interface, and the TPMS diagnostic tool is upgraded according to the upgrade package. In the process described above, the TPMS diagnostic tool may automatically determine whether the TPMS diagnostic tool needs to be upgraded. When it is determined that the TPMS diagnostic tool needs to be upgraded, the upgrade package may be automatically downloaded, and the diagnostic tool may be upgraded according to the upgrade package, thereby not only upgrading the TPMS diagnostic tool in a timely manner, but also simplifying a process of upgrading the TPMS diagnostic tool.

It should be noted that FIG. 1 is merely an example architectural diagram of upgrading a TPMS diagnostic tool, but is not intended to limit an architecture. During actual application, another feasible architecture may alternatively be adopted. For example, the functional module and the upgrade module in the TPMS diagnostic tool may alternatively be integrated into one module.

Specific embodiments are used below to describe the technical solutions of the present application in detail. It should be noted that the following several specific embodiments may be combined with each other, and same or similar content is not repeatedly described in different embodiments.

Figure 2:
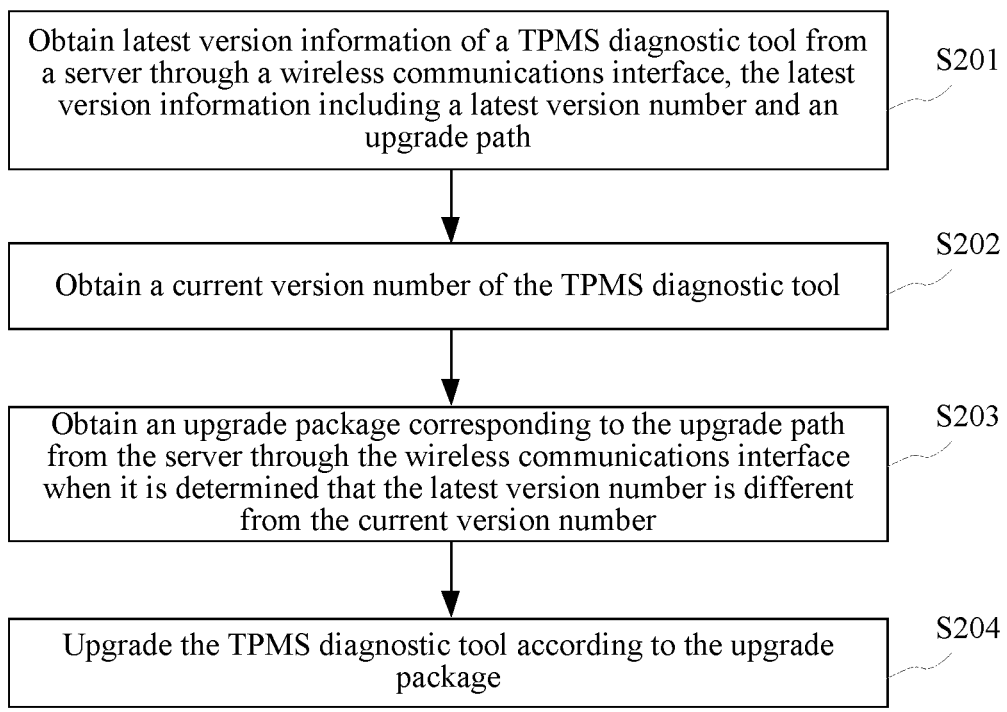
FIG. 2 is a first schematic flowchart of a method for upgrading a TPMS diagnostic tool according to an embodiment of the present invention.

FIG. 2 is a first schematic flowchart of a method for upgrading a TPMS diagnostic tool according to an embodiment of the present invention. Referring to FIG. 2, the method may include the following steps.

S201. Obtain latest version information of the TPMS diagnostic tool from a server through the wireless communications interface, the latest version information including a latest version number and an upgrade path.

The upgrade path is used for indicating a storage location of an upgrade package of the TPMS diagnostic tool in the server.

It should be noted that the TPMS diagnostic tool usually includes a software part and a hardware part, and upgrade of the TPMS diagnostic tool in this embodiment of the present invention means upgrading the software part of the TPMS diagnostic tool.

This embodiment of the present invention may be performed by the TPMS diagnostic tool, or by an upgrade apparatus disposed inside the TPMS diagnostic tool. Optionally, the upgrade apparatus may be implemented by using software, or by using a combination of software and hardware.

In this embodiment of the present invention, the TPMS diagnostic tool is provided with a wireless communications interface. Optionally, the wireless communications interface may be a wireless-fidelity (Wi-Fi) module or a general packet radio service (GPRS) module. Certainly, the wireless communications interface may alternatively be another component, provided that the TPMS diagnostic tool can access a wireless network through the wireless communications interface. This is not specifically limited in this embodiment of the present invention.

Optionally, the wireless network may be accessed through the wireless communications interface before S201.

It should be noted that during access to the wireless network through the wireless communications interface, a plurality of attempts may be made to access the wireless network through the wireless communications interface, and if the wireless network cannot be accessed after the plurality of attempts, the procedure ends.

Optionally, before S201, a wireless connection further needs to be established to the server through the wireless communications interface.

It should be noted that during establishment of the wireless connection to the server through the wireless communications interface, a plurality of attempts may be made to establish the wireless connection to the server through the wireless communications interface, and if the wireless connection cannot be established to the server after the plurality of attempts, the procedure ends.

Optionally, the latest version information of the TPMS diagnostic tool may be obtained from the server through the wireless communications interface when it is determined to access a wireless network through the wireless communications interface or when an upgrade query instruction input by a user is received. Certainly, during actual application, the latest version information is obtained when there are other conditions. This is not specifically limited in this embodiment of the present invention.

Optionally, after the TPMS diagnostic tool accesses the wireless network, the user may input an upgrade query instruction into the TPMS diagnostic tool. The upgrade query instruction is used for requesting to query whether the TPMS diagnostic tool needs to be upgraded.

Optionally, a version information obtaining request may be sent to the server through the wireless communications interface. The version information obtaining request is used for requesting to obtain the latest version information. After receiving the version information obtaining request, the server obtains a latest version number and an upgrade path of the TPMS, and sends a version information obtaining response to the TPMS diagnostic tool, the version information obtaining response carrying the latest version number and the upgrade path.

Optionally, after the latest version information is obtained, it may be determined whether the latest version information is valid.

Optionally, whether the latest version information is valid may be determined by using the following feasible implementations: determining whether the latest version information includes both the latest version number and the upgrade path. If no, it means that the obtained latest version information is incorrect, and the latest version information needs to be re-obtained. If yes, verification is further performed to determine whether the obtained latest version number and upgrade path are correct. Optionally, a format of the latest version number and a format of the upgrade path may be obtained, and verification is performed on the latest version information according to the format of the latest version number and the format of the upgrade path.

Optionally, if the verification on the latest version information fails, the latest version information is re-obtained, and a quantity of invalid times of obtaining the latest version information is accumulated. When the quantity of invalid times is less than a preset quantity-of-times threshold, and the re-obtained latest version information is valid, S202 is then performed.

Optionally, if the verification on the latest version information fails, the latest version information is re-obtained, and duration for re-obtaining the latest version information is recorded. When the duration is less than a preset duration threshold, and the re-obtained latest version information is valid, S202 is then performed.

In the process described above, S202 is further performed only when the verification on the latest version information succeeds. If the verification on the latest version information fails a plurality of times, or verification on the latest version information fails within preset duration, the procedure ends. In this way, the TPMS diagnostic tool may be prevented from being upgraded according to incorrect latest version information.

S202. Obtain a current version number of the TPMS diagnostic tool.

Optionally, the current version number of the TPMS diagnostic tool may be obtained locally from the TPMS diagnostic tool.

For example, the current version number of the TPMS diagnostic tool may be stored in a locally preset file of the TPMS diagnostic tool. Correspondingly, the current version number of the TPMS diagnostic tool may be directly obtained from the preset file.

S203. Obtain an upgrade package corresponding to the upgrade path from the server through the wireless communications interface when it is determined that the latest version number is different from the current version number.

Optionally, a version number of the TPMS diagnostic tool usually meets a preset format requirement. The latest version number and the current version number may be compared in a bit-by-bit manner. When characters on corresponding bits of the latest version number and the current version number are different, it is determined that the latest version number is different from the current version number.

It should be noted that the latest version number of the TPMS diagnostic tool on the server is usually the same as the current version number of the TPMS diagnostic tool, or higher than the current version number of the TPMS diagnostic tool. Therefore, when the latest version number is different from the current version number, it means that the TPMS diagnostic tool needs to be upgraded.

Optionally, an upgrade package obtaining request may be sent to the server through the wireless communications interface, the upgrade package obtaining request including the upgrade path. After the server receives the upgrade package obtaining request, the upgrade package may be obtained from the server according to the upgrade path, and an upgrade package obtaining response is sent, the upgrade package obtaining response carrying the upgrade package.

Optionally, when it is determined that the latest version number is different from the current version number, upgrade indication information may be generated. The upgrade indication information is used for prompting the user whether the TPMS diagnostic tool needs to be upgraded. If the user does not need to upgrade the TPMS diagnostic tool, the user may input upgrade cancellation information into the TPMS diagnostic tool, and a TPMS may end the procedure according to the upgrade cancellation information. If the user needs to upgrade the TPMS diagnostic tool, the user may input upgrade confirmation information into the TPMS diagnostic tool, and the TPMS diagnostic tool may obtain the upgrade package from the server according to the upgrade confirmation information.

S204. Upgrade the TPMS diagnostic tool according to the upgrade package.

Optionally, after the upgrade package is obtained from the server, verification may be performed on the upgrade package. After the verification on the upgrade package succeeds, the TPMS diagnostic tool is upgraded according to the upgrade package.

According to the method for upgrading a TPMS diagnostic tool, the TPMS diagnostic tool is provided with a wireless communications interface, and a wireless network may be accessed through the wireless communications interface. After the wireless network is accessed, latest version information of the TPMS diagnostic tool may be obtained from a server through the wireless communications interface, and a current version number of the TPMS diagnostic tool may be obtained. When it is determined that a latest version number is different from the current version number, an upgrade package is obtained from the server through the wireless communications interface according to an upgrade path, and the TPMS diagnostic tool is upgraded according to the upgrade package. In the process described above, the TPMS diagnostic tool may automatically determine whether the TPMS diagnostic tool needs to be upgraded. When it is determined that the TPMS diagnostic tool needs to be upgraded, the upgrade package may be automatically downloaded, and the diagnostic tool may be upgraded according to the upgrade package, thereby not only upgrading the TPMS diagnostic tool in a timely manner, but also simplifying a process of upgrading the TPMS diagnostic tool.

Based on either of the embodiments described above, the method for upgrading the TPMS diagnostic tool is further described below in detail by using the embodiment shown in FIG. 3.

Figure 3:
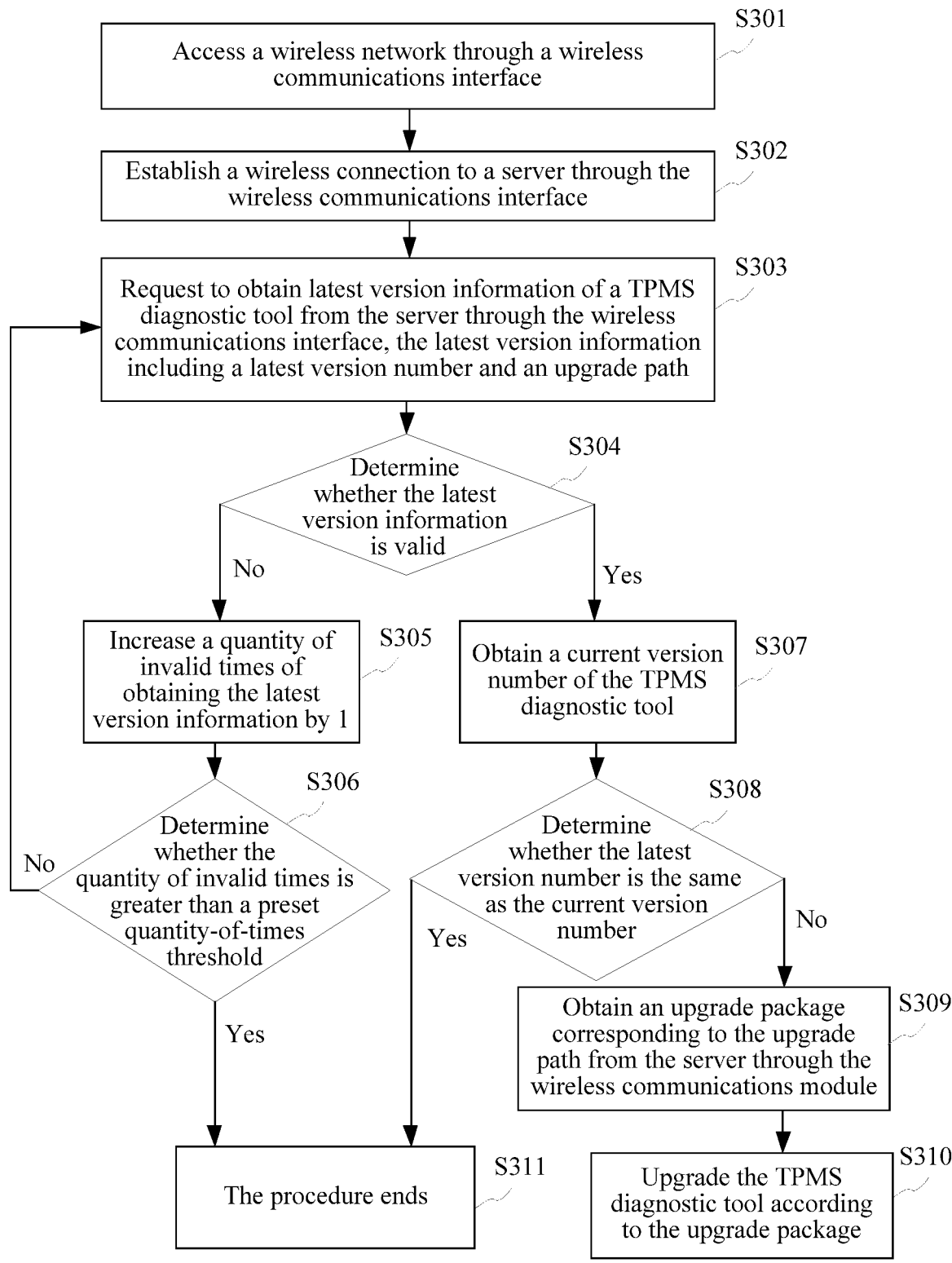
FIG. 3 is a second schematic flowchart of a method for upgrading a TPMS diagnostic tool according to an embodiment of the present invention.

FIG. 3 is a second schematic flowchart of a method for upgrading a TPMS diagnostic tool according to an embodiment of the present invention. Referring to FIG. 3, the method may include the following steps.

S301. Access a wireless network through a wireless communications interface.

Optionally, during access to a wireless network through the wireless communications interface, after access to the wireless network is requested for once, whether the wireless network is successfully accessed may be determined. If yes, S302 is performed, or if no, access to the wireless network continues to be requested until the wireless network is successfully accessed, or the procedure ends when a quantity of times of requesting to access the wireless network is greater than a preset quantity of times.

S302. Establish a wireless connection to a server through the wireless communications interface.

Optionally, a wireless connection establishment request may be sent to the server through the wireless communications interface, and a wireless connection establishment response sent by the server may be received. After the wireless connection establishment response is received, whether the wireless connection is successfully established to the server is determined according to the wireless connection establishment response. If yes, the procedure proceeds to S303, or if no, establishment of a wireless connection to the server continues to be requested until the wireless connection is successfully established to the server. Alternatively, when a quantity of times of requesting to establish the wireless connection to the server is greater than a preset quantity of times, the procedure ends.

S303. Request to obtain latest version information of the TPMS diagnostic tool from the server through the wireless communications interface, the latest version information including a latest version number and an upgrade path.

Optionally, after the latest version information is obtained, verification may be performed on the latest version information. When the verification on the latest version information succeeds, the procedure proceeds to S302; otherwise, the latest version information is re-obtained until verification on the obtained latest version information succeeds, or the procedure ends when a quantity of times of obtaining the latest version information is greater than a preset quantity of times.

It should be noted that for a process of performing verification on the latest version information, reference may be made to S201, and details are not described herein again.

S304. Determine whether the latest version information is valid.

If yes, perform S307.

If no, perform S305.

S305. Increase a quantity of invalid times of obtaining the latest version information by 1.

Initially, the quantity of invalid times is 0.

S306. Determine whether the quantity of invalid times is greater than a preset quantity-of-times threshold.

If yes, perform S311.

If no, perform S303.

S307. Obtain a current version number of the TPMS diagnostic tool.

It should be noted that for a process of performing S304, references may be made to S202, and details are not described herein again.

S308. Determine whether the latest version number is the same as the current version number.

If yes, perform S311.

If no, perform S309.

S309. Obtain an upgrade package corresponding to the upgrade path from the server through the wireless communications interface.

After the upgrade package is obtained, verification may be performed on the upgrade package.

Optionally, if the verification on the upgrade package fails, the upgrade package is re-obtained and verification is performed until the verification on the obtained upgrade package succeeds, or the procedure ends when a quantity of times of downloading the upgrade package is greater than a preset quantity of times.

Optionally, if the upgrade package is relatively large, during downloading of the upgrade package, the upgrade package may be transmitted in subpackages, and verification is respectively performed on all the subpackages. If the verification on all the subpackages succeeds, the verification on the upgrade package succeeds.

S310. Upgrade the TPMS diagnostic tool according to the upgrade package.

Optionally, when the upgrade ends, verification may be performed on upgraded data according to a stipulated algorithm. If the verification succeeds, it represents that the upgrade is completed; otherwise, an upgrade operation is re-performed until the verification succeeds, or perform.

S311. The procedure ends.

In the embodiment shown in FIG. 3, the TPMS diagnostic tool may access the wireless network through the wireless communications interface. After the wireless network is accessed, the latest version information of the TPMS diagnostic tool may be obtained from the server through the wireless communications interface, and the current version number of the TPMS diagnostic tool may be obtained. When it is determined that the latest version number is different from the current version number, the upgrade package is obtained from the server through the wireless communications interface according to the upgrade path, and the TPMS diagnostic tool is upgraded according to the upgrade package. In the process described above, the TPMS diagnostic tool may automatically determine whether the TPMS diagnostic tool needs to be upgraded. When it is determined that the TPMS diagnostic tool needs to be upgraded, the upgrade package may be automatically downloaded, and the diagnostic tool may be upgraded according to the upgrade package, thereby not only upgrading the TPMS diagnostic tool in a timely manner, but also simplifying a process of upgrading the TPMS diagnostic tool.

Figure 4:
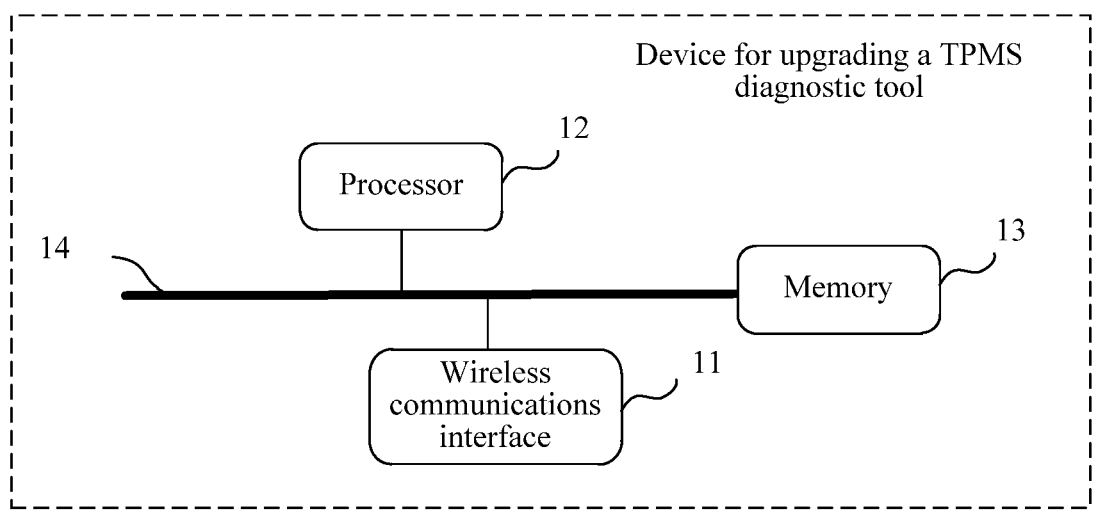
FIG. 4 is a schematic structural diagram of a device for upgrading a TPMS diagnostic tool according to an embodiment of the present invention.

FIG. 4 is a schematic structural diagram of a device for upgrading a TPMS diagnostic tool according to an embodiment of the present invention. Referring to FIG. 4, a wireless communications interface 11, a processor 12, a memory 13 and a communications bus 14 are included. The communications bus 14 is configured to implement a connection between components. The memory 13 is configured to store a program instruction. The processor 12 is configured to read the program instruction in the memory 13 and perform the following steps according to the program instruction in the memory 13:

obtaining latest version information of the TPMS diagnostic tool from a server through the wireless communications interface 11, the latest version information including a latest version number and an upgrade path, the upgrade path being used for indicating a storage location of an upgrade package of the TPMS diagnostic tool in the server;

obtaining a current version number of the TPMS diagnostic tool;

obtaining an upgrade package corresponding to the upgrade path from the server through the wireless communications interface 11 when it is determined that the latest version number is different from the current version number; and upgrading the TPMS diagnostic tool according to the upgrade package.

The device for upgrading the TPMS diagnostic tool provided in this embodiment of the present invention may perform the technical solutions described in the foregoing method embodiments. Implementation principles and beneficial effects thereof are similar, and details are not described herein again.

In a possible implementation, the processor 12 is specifically configured to:

obtain the latest version information of the TPMS diagnostic tool from the server through the wireless communications interface 11 when it is determined to access a wireless network through the wireless communications interface 11 or when an upgrade query instruction input by a user is received.

In another possible implementation, the processor 12 is further configured to:

generate upgrade indication information before the processor obtains the upgrade package corresponding to the upgrade path from the server through the wireless communications interface 11; and receive upgrade confirmation information input by the user according to the upgrade indication information.

In another possible implementation, the processor 12 is further configured to:

determine whether the latest version information is valid before the processor obtains the current version number of the TPMS diagnostic tool; and correspondingly, the processor 12 is specifically configured to obtain the current version number of the TPMS diagnostic tool when it is determined that the latest version information is valid.

In another possible implementation, the processor 12 is specifically configured to:
obtain a format of the latest version number and a format of the upgrade path; and
determine whether the latest version information is valid according to the format of the latest version number and the format of the upgrade path.

In another possible implementation, the processor 12 is further configured to:
re-obtain the latest version information and accumulate a quantity of invalid times of obtaining the latest version information when the processor determines that the latest version number is invalid; and
correspondingly, the processor 12 is specifically configured to obtain the current version number of the TPMS diagnostic tool when the quantity of invalid times is less than a preset quantity-of-times threshold and the re-obtained latest version information is valid.

In another possible implementation, the processor 12 is further configured to:
re-obtain the latest version information and record duration for re-obtaining the latest version information when the processor determines that the latest version number is invalid; and
correspondingly, the processor is specifically configured to obtain the current version number of the TPMS diagnostic tool when the duration is less than a preset duration threshold and the re-obtained latest version information is valid.

In another possible implementation, the processor 12 is specifically configured to:
perform verification on the upgrade package; and
upgrade the TPMS diagnostic tool according to the upgrade package after the verification on the upgrade package succeeds.

The device for upgrading the TPMS diagnostic tool provided in this embodiment of the present invention may perform the technical solutions described in the foregoing method embodiments. Implementation principles and beneficial effects thereof are similar, and details are not described herein again.

Figure 5:
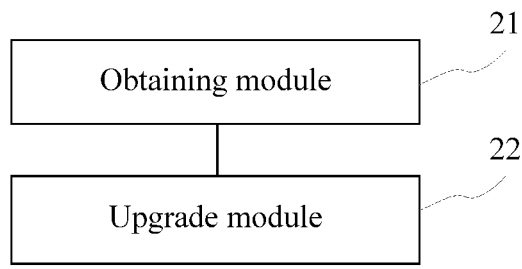
FIG. 5 is a first schematic structural diagram of an apparatus for upgrading a TPMS diagnostic tool according to an embodiment of the present invention.

FIG. 5 is a first schematic structural diagram of an apparatus for upgrading a TPMS diagnostic tool according to an embodiment of the present invention. The TPMS diagnostic tool is provided with a wireless communications interface. Referring to FIG. 5, the apparatus includes an obtaining module 21 and an upgrade module 22.

The obtaining module 21 is configured to obtain latest version information of the TPMS diagnostic tool from a server through the wireless communications interface, the latest version information including a latest version number and an upgrade path, the upgrade path being used for indicating a storage location of an upgrade package of the TPMS diagnostic tool in the server.

The obtaining module 21 is further configured to obtain a current version number of the TPMS diagnostic tool.

The obtaining module 21 is further configured to obtain an upgrade package corresponding to the upgrade path from the server through the wireless communications interface when it is determined that the latest version number is different from the current version number.

The upgrade module 22 is configured to upgrade the TPMS diagnostic tool according to the upgrade package.

The apparatus for upgrading the TPMS diagnostic tool provided in this embodiment of the present invention may perform the technical solutions described in the foregoing method embodiments. Implementation principles and beneficial effects thereof are similar, and details are not described herein again.

In a possible implementation, the obtaining module 21 is specifically configured to:
obtain the latest version information of the TPMS diagnostic tool from the server through the wireless communications interface when it is determined to access a wireless network through the wireless communications interface or when an upgrade query instruction input by a user is received.

Figure 6:
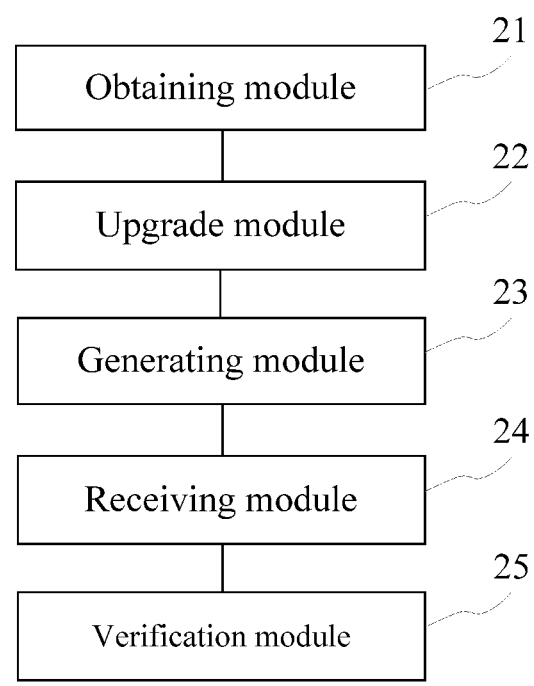
FIG. 6 is a second schematic structural diagram of an apparatus for upgrading a TPMS diagnostic tool according to an embodiment of the present invention.

FIG. 6 is a second schematic structural diagram of an apparatus for upgrading a TPMS diagnostic tool according to an embodiment of the present invention. Based on the embodiment shown in FIG. 5, referring to FIG. 6, the apparatus further includes a generating module 23 and a receiving module 24.

The generating module 23 is configured to generate upgrade indication information before the obtaining module 21 obtains the upgrade package corresponding to the upgrade path from the server through the wireless communications interface.

The receiving module 24 is configured to receive upgrade confirmation information input by the user according to the upgrade indication information.

In another possible implementation, the apparatus further includes a verification module 25.

The verification module 25 is configured to determine whether the latest version information is valid before the obtaining module obtains the current version number of the TPMS diagnostic tool.

Correspondingly, the obtaining module 21 is specifically configured to obtain the current version number of the TPMS diagnostic tool when it is determined that the latest version information is valid.

In another possible implementation, the verification module 25 is specifically configured to:
obtain a format of the latest version number and a format of the upgrade path; and
determine whether the latest version information is valid according to the format of the latest version number and the format of the upgrade path.

In another possible implementation, the obtaining module 21 is further configured to:
re-obtain the latest version information and accumulate a quantity of invalid times of obtaining the latest version information when it is determined that the latest version number is invalid; and
obtain the current version number of the TPMS diagnostic tool when the quantity of invalid times is less than a preset quantity-of-times threshold and the re-obtained latest version information is valid.

In another possible implementation, the obtaining module 21 is further configured to:
re-obtain the latest version information and record duration for re-obtaining the latest version information when it is determined that the latest version number is invalid; and
obtain the current version number of the TPMS diagnostic tool when the duration is less than a preset duration threshold and the re-obtained latest version information is valid.

In another possible implementation, the upgrade module 22 is specifically configured to: perform verification on the upgrade package; and upgrade the TPMS diagnostic tool according to the upgrade package after the verification on the upgrade package succeeds.

The apparatus for upgrading the TPMS diagnostic tool provided in this embodiment of the present invention may perform the technical solutions described in the foregoing method embodiments. Implementation principles and beneficial effects thereof are similar, and details are not described herein again.

An embodiment of the present invention further provides a readable storage medium, including a program or an instruction, when the program or instruction is run on a computer, the technical solutions described in any of the method embodiments being performed.

A person of ordinary skill in the art may understand that all or some of the steps of the foregoing method embodiments may be implemented by program instructing relevant hardware. The aforementioned program may be stored in a computer-readable storage medium. During execution of the program, the steps of the foregoing method embodiments are performed; and the aforementioned storage medium includes various media that can store program code, such as a ROM, a RAM, a magnetic disk, an optical disc or the like.

Finally, it should be noted that the foregoing embodiments are merely used for describing the technical solutions in the embodiments of the present invention, but are not intended to limit the embodiments of the present invention. Although the embodiments of the present invention is described in detail with reference to the foregoing embodiments, a person of ordinary skill in the art should understand that, modifications may still be made to the technical solutions recorded in the foregoing embodiments, or equivalent replacements may be made to part or all of the technical features; and these modifications or replacements will not cause the essence of corresponding technical solutions to depart from the scope of the technical solutions in the embodiments of the present invention.

What is claimed is:

1. A method for upgrading a tire pressure monitoring system (TPMS) diagnostic tool, wherein the TPMS diagnostic tool is provided with a wireless communications interface, and the method comprises:
   obtaining latest version information of the TPMS diagnostic tool from a server through the wireless communications interface, the latest version information comprising a latest version number and an upgrade path, the upgrade path being used for indicating a storage location of an upgrade package of the TPMS diagnostic tool in the server;
   determining whether the latest version information is valid;
   if it is determined that the latest version number is invalid;
      re-obtaining the latest version information, and accumulating a quantity of invalid times of obtaining the latest version information; and
      the obtaining a current version number of the TPMS diagnostic tool comprises:
         obtaining the current version number of the TPMS diagnostic tool when the quantity of invalid times is less than a preset quantity-of-times threshold and the re-obtained latest version information is valid;
   obtaining the upgrade package corresponding to the upgrade path from the server through the wireless communications interface when it is determined that the latest version number is different from the current version number; and
   upgrading the TPMS diagnostic tool according to the upgrade package.

2. The method according to claim 1, wherein the obtaining latest version information of the TPMS diagnostic tool from a server through the wireless communications interface comprises:
   obtaining the latest version information of the TPMS diagnostic tool from the server through the wireless communications interface when it is determined to access a wireless network through the wireless communications interface or when an upgrade query instruction input by a user is received.

3. The method according to claim 1, before the obtaining an upgrade package corresponding to the upgrade path from the server through the wireless communications interface, further comprising:
   generating upgrade indication information; and
   receiving upgrade confirmation information input by the user according to the upgrade indication information.

4. The method according to claim 1,
   after the determining whether the latest version information is valid, further comprising:
      obtaining the current version number of the TPMS diagnostic tool if it is determined that the latest version information is valid.

5. The method according to claim 4, wherein the determining whether the latest version information is valid comprises:
   obtaining a format of the latest version number and a format of the upgrade path; and
   determining whether the latest version information is valid according to the format of the latest version number and the format of the upgrade path.

6. The method according to claim 4, wherein if it is determined that the latest version number is invalid, the method further comprises:
   re-obtaining the latest version information, and recording duration for re-obtaining the latest version information; and
   the obtaining a current version number of the TPMS diagnostic tool comprises:
      obtaining the current version number of the TPMS diagnostic tool when the duration is less than a preset duration threshold and the re-obtained latest version information is valid.

7. The method according to claim 1, wherein the upgrading the TPMS diagnostic tool according to the upgrade package comprises:
   performing verification on the upgrade package; and
   upgrading the TPMS diagnostic tool according to the upgrade package after the verification on the upgrade package succeeds.

8. A device for upgrading a tire pressure monitoring system (TPMS) diagnostic tool, comprising a wireless communications interface, a processor, a memory and a communications bus, wherein the communications bus is configured to implement a connection between components, the memory is configured to store a program instruction, and the processor is configured to read the program instruction in the memory and perform the following steps according to the program instruction in the memory:
   obtaining latest version information of the TPMS diagnostic tool from a server through the wireless communications interface, the latest version information comprising a latest version number and an upgrade path, the upgrade path being used for indicating a storage location of an upgrade package of the TPMS diagnostic tool in the server;
determine whether the latest version information is valid before the processor obtains the current version number of the TPMS diagnostic tool, and the processor is configured to:
re-obtain the latest version information and accumulate a quantity of invalid times of obtaining the latest version information when the processor determines that the latest version number is invalid; and
obtain the current version number of the TPMS diagnostic tool when the quantity of invalid times is less than a preset quantity-of-times threshold and the re-obtained latest version information is valid
obtaining the upgrade package corresponding to the upgrade path from the server through the wireless communications interface when it is determined that the latest version number is different from the current version number; and
upgrading the TPMS diagnostic tool according to the upgrade package.

9. The device according to claim 8, wherein the processor is specifically configured to:
obtain the latest version information of the TPMS diagnostic tool from the server through the wireless communications interface when it is determined to access a wireless network through the wireless communications interface or when an upgrade query instruction input by a user is received.

10. The device according to claim 8, wherein the processor is further configured to:
generate upgrade indication information before the processor obtains the upgrade package corresponding to the upgrade path from the server through the wireless communications interface; and receive upgrade confirmation information input by the user according to the upgrade indication information.

11. The device according to claim 8, wherein the processor is further configured to:
obtain the current version number of the TPMS diagnostic tool when it is determined that the latest version information is valid.

12. The device according to claim 11, wherein the processor is specifically configured to:
obtain a format of the latest version number and a format of the upgrade path; and
determine whether the latest version information is valid according to the format of the latest version number and the format of the upgrade path.

13. The device according to claim 11, wherein the processor is further configured to:
re-obtain the latest version information and record duration for re-obtaining the latest version information when the processor determines that the latest version number is invalid; and
correspondingly, the processor is specifically configured to obtain the current version number of the TPMS diagnostic tool when the duration is less than a preset duration threshold and the re-obtained latest version information is valid.

14. The device according to claim 8, wherein the processor is specifically configured to:
perform verification on the upgrade package; and
upgrade the TPMS diagnostic tool according to the upgrade package after the verification on the upgrade package succeeds.

\* \* \* \* \*